Aug. 15, 1961 R. A. KRAUS ET AL 2,995,969
PUSH-TYPE FASTENER
Filed Nov. 3, 1958 2 Sheets-Sheet 1
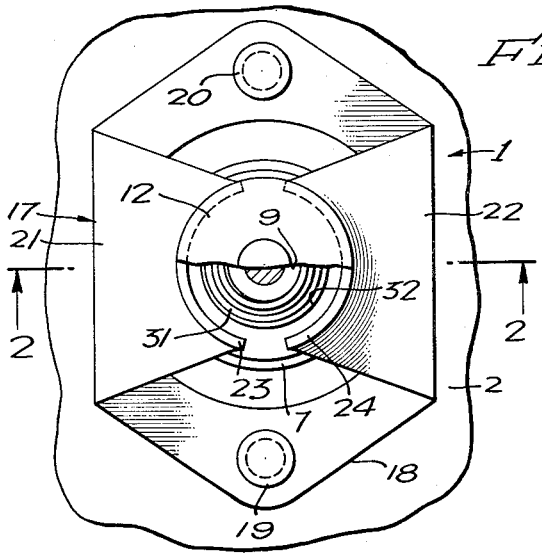
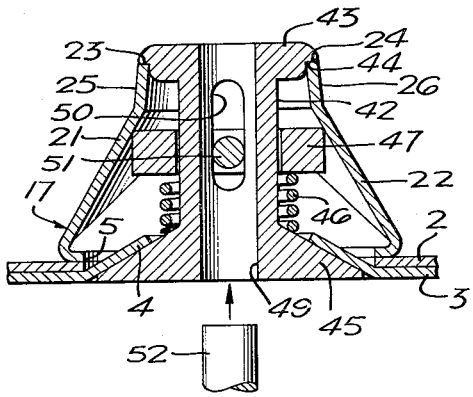
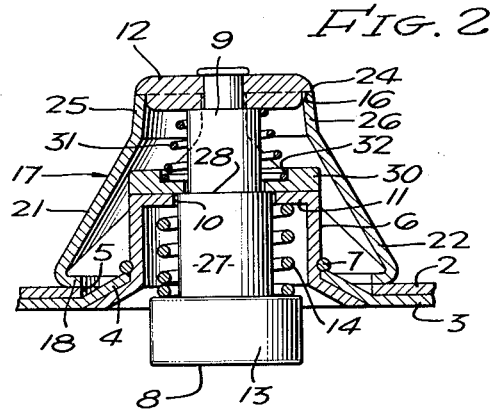
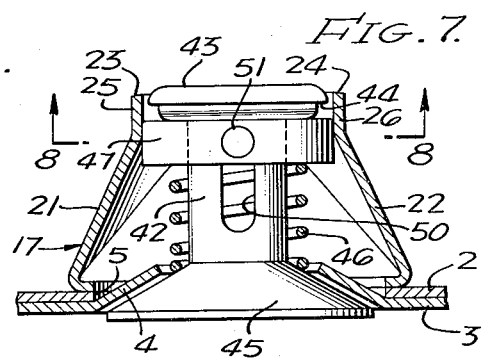
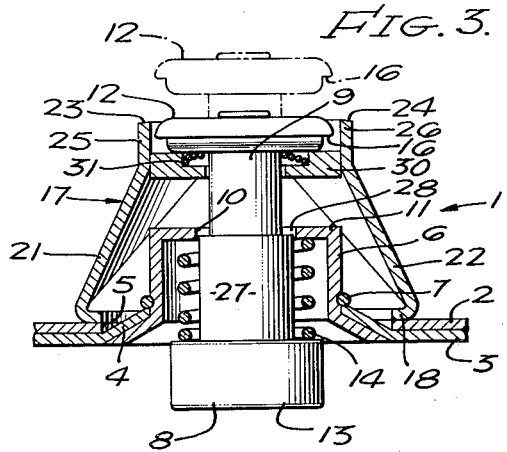
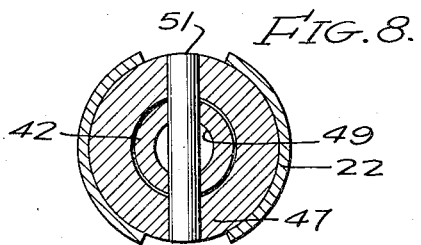
ROBERT A. KRAUS
EDMUND J. KRAUS
INVENTORS
BY *Richard F. Carr*
ATTORNEY

ROBERT A. KRAUS
EDMUND J. KRAUS
INVENTORS

BY Richard F. Carr

ATTORNEY

United States Patent Office 2,995,969
Patented Aug. 15, 1961

2,995,969
PUSH-TYPE FASTENER
Robert A. Kraus and Edmund J. Kraus, Redondo Beach, Calif., assignors to Deutsch Fastener Corporation
Filed Nov. 3, 1958, Ser. No. 771,674
6 Claims. (Cl. 85—5)

This invention pertains to a fastener and more particularly to a readily releasable fastener for detachably securing one part to another.

It is an object of this invention to provide a fastener which will securely hold parts together, yet is readily engaged or released by push operation.

Another object of this invention is to provide a fastener which may be engaged or released without the use of special tools.

A further object of this invention is to provide a fastener having resilient leaf spring members holding the unit together, which leaf springs are separated and frictionally held by a release member when the fastener is opened.

These and other objects will become apparent from the following detailed description taken in connection with the accompanying drawing in which:

FIG. 1 is a top plan view of the fastener of this invention;

FIG. 2 is an axial sectional view taken along line 2—2 of FIG. 1 showing the parts in assembled relationship;

FIG. 3 is a sectional view similar to FIG. 2, but with the fastener in the intermediate position during release;

FIG. 6 is a sectional view similar to FIG. 2, but of a modified form of the invention;

FIG. 7 is a sectional view of the embodiment of FIG. 6 in the intermediate position during release; and FIG. 8 is a sectional view taken along line 8—8 of FIG. 7, showing the attachment for the release collar.

Figure 4:
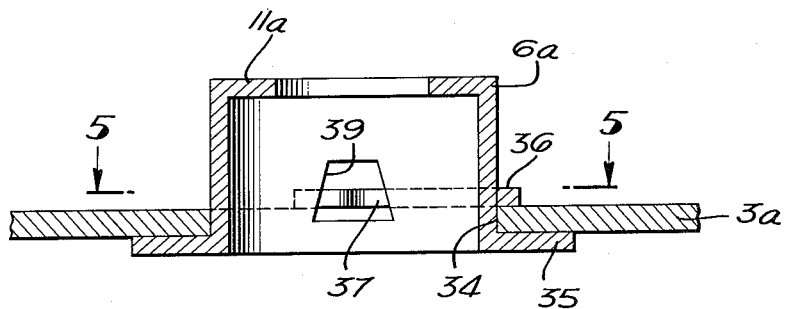
FIG. 4 is an axial sectional view showing the arrangement for attaching the receptacle to the bottom sheet for compensating for variations in sheet thickness.

The fastener 1 of this invention is illustrated herein in use for securing together sheets 2 and 3. These sheet members are provided with matching apertures at the location of the fastener, and in the version illustrated in FIGS. 1–3 the opening sheet 3 is defined by dimple 4 extending into aperture 5 of sheet 2.

A cup-shaped receptacle member 6 complementarily engages dimpled portion 4 of sheet 3, and is secured thereto by suitable means such as snap ring 7. Member 6 projects through the apertures in the two sheets. A plunger 8 is received within receptacle 6 and includes end portion 9 which extends through aperture 10 in end wall 11 of receptacle 6. End 9 terminates in a disc-like head 12 secured to the plunger, while a pushbutton enlargement 13 is provided on the opposite end. Compression spring 14 within the receptacle member, interposed between end wall 11 and pushbutton 13, urges the plunger downwardly with respect to the receptacle. This movement is resisted when the fastener is in the attached position of FIG. 2 by the engagement of shoulder 16 of head 12 with resilient retainer 17.

The latter member includes a base portion 18 secured to sheet 2 by rivets 19 and 20 from which project two leaf spring elements 21 and 22. These leaf spring elements incline upwardly and inwardly toward the plunger. Upper ends 23 and 24 of the two leaf spring elements are arcuate in shape, complementary to shoulder 16 of head 12, and are biased inwardly against the head. Preferably leaf spring elements 21 and 22 are inclined at a more shallow angle with respect to the axis of the plunger at sections 25 and 26 thereof adjacent their upper ends, for reasons made more clear hereinafter.

End portion 9 of plunger 8 is smaller in diameter than portion 27 thereof within the receptacle, thereby defining annular shoulder 28 between these two sections of the plunger. Release collar 30 is received on end portion 9 of plunger 8 above shoulder 28. Collar 30 is freely slidable on portion 9 of the plunger and is maintained normally in engagement with end wall 11 of the receptacle member by light compression spring 31 received in recess 32 of collar 30, bearing against the undersurface of head 12.

In releasing the fastener of this invention from the locked position of FIG. 2, pushbutton end 13 is pressed inwardly, moving the plunger a distance indicated generally by the location of head 12 as shown in phantom in FIG. 3. This movement causes shoulder 28, reacting against the undersurface of release collar 30, to move the collar upwardly to where it engages leaf spring elements 21 and 22. This spreads the leaf spring elements so that they are opened up beyond the periphery of head 12 of the plunger. When collar 30 expands the leaf springs in this manner, it is brought into contact with portions 25 and 26 of the leaf springs and becomes frictionally retained thereby. In other words, the frictional force between the collar and the leaf springs holds the collar against axial movement. This maintains the leaf springs in the opened position of FIG. 3 where they are remote from head 12 of the plunger, and permits spring 14 to shift the plunger downwardly. The plunger then slides relative to collar 30 and brings head 12 down below upper ends 23 and 24 of the leaf spring elements as shown. In this manner the holding means securing the fastener together is released and sheet 3 may be separated from sheet 2. Thus, merely by pushing inwardly on the plunger and then releasing the plunger, the fastener is unlocked and the sheets are freely separated. As sheets 2 and 3 are moved apart from the position of FIG. 3, head 12 overcomes the frictional force to move release collar 30 downwardly out of engagement with the leaf springs. When the fastener is released, the receptacle and plunger are retained by lock ring 7 to sheet 3, while rivets 19 and 20 hold retainer 17 to sheet 2.

The fastener is returned to its secured position simply by pushing the plunger and receptacle unit back within retainer 17 so that head 12 again is brought above ends 23 and 24 of the leaf spring elements. The leaf springs then snap into place to engage shoulder 16 of head 12 and resist any forces tending to withdraw the plunger outwardly from the receptacle. This, in turn, through spring 14 and receptacle 6 precludes separation of sheet 3 from sheet 2. When the fastener is moved to its locked position, it will be noted that the plunger is moved sufficiently only to bring head 12 above the ends of the leaf spring elements, but does not move inwardly a distance that will bring release collar 30 again to a position of engagement with the leaf spring elements.

It may be seen, therefore, that return of the fastener to the locked position is as simple as releasing the fastener, and again is accomplished merely by pressing on the plunger.

Figure 5:
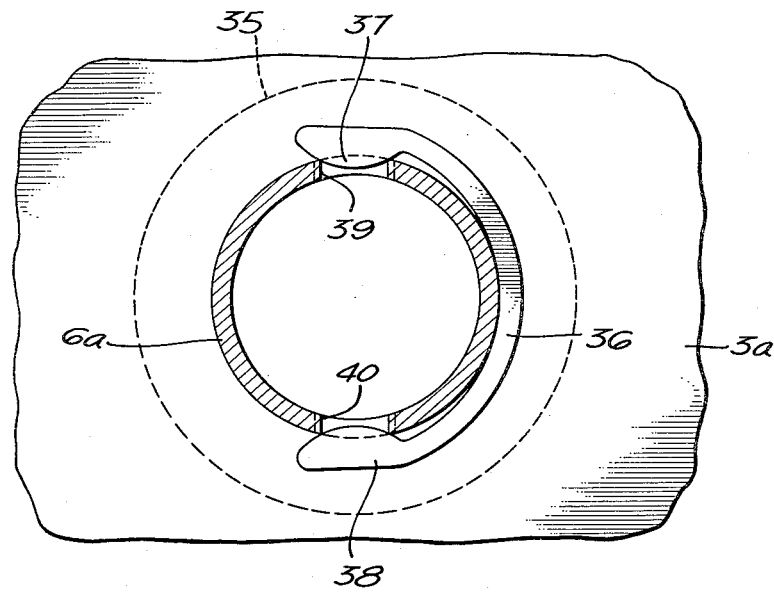
FIG. 5 is a sectional view taken along line 5—5 of FIG. 4.

FIGS. 4 and 5 illustrate an alternate arrangement for the receptacle member where the sheet to which it is attached is not dimpled at the opening as in the previously described embodiment. Here receptacle $6_a$ is received within opening 34 of sheet $3_a$, projecting through the sheet as before. Flange 35 extends at right angles from the side wall of the receptacle beneath sheet $3_a$. Instead of lock ring 7, receptacle $6_a$ is secured to the sheet by a split C-shaped ring 36 having a free diameter less than the outer diameter of member $6_a$. End portions 37 and 38, rounded on the inner edges thereof as shown, enter diametrically opposed tapered openings 39 and 40 in the receptacle and prevent disengagement of the receptacle from sheet $3_a$. The fact that openings 39 and 40 are tapered toward end wall $11_a$ of the receptacle is important in increasing the versatility of the fastener of this invention. The taper means that the resilient force exerted by ring 36 will cause a reaction against the walls of these openings which urges ring 36 downwardly with respect to the receptacle and against the top surface of sheet $3_a$. This, in turn, forces flange 35 tightly against the bottom surface of sheet $3_a$. As a result, the receptacle will be firmly held in place against the sheet with which it is associated, regardless of the thickness of the sheet. The tapered recess and split ring always will force flange 35 against the sheet whether the sheet is thicker or thinner than sheet $3_a$ as illustrated. This provides an automatic adjustment for variations in sheet thickness.

According to the modified version of FIGS. 6-8, the plunger and release collar portions of the fastener are changed, but the retainer 17 may be identical to that of the previously described embodiment. Plunger 42 of the modified form of the invention may be of one piece construction provided with integral head 43 similar to head 12 of plunger 8. Shoulder 44 of head 43 is engaged by outer ends 23 and 24 of the leaf spring elements which secure plunger 42 just as plunger 8 was held. For flush installations, bottom end 45 of plunger 42 may be frusto-conical in shape and received within dimpled portion 4 of sheet 3. A spring 46 bears against end 45 and also against release collar 47 slidable on the outer surface of the plunger 42. The collar engages the inner surface of leaf spring elements 21 and 22, being urged thereagainst by spring 46.

Plunger 42 includes an interior bore 49 communicating with opposed axial slots 50 through the plunger wall. A pin 51 is received within slots 50 and projects through the plunger to be received by release collar 47. Slots 50, therefore, limit the travel of collar 47 relative to plunger 42.

In releasing the fastener from the position of FIG. 6, any suitable member such as rod 52 is inserted within bore 49 of plunger 42 and pushed against transverse pin 51. The movement of the rod against the pin forces collar 47 upwardly against leaf spring elements 21 and 22, spreading the same apart similarly to the action of collar 30. Again portions 25 and 26 of the leaf spring engage the release collar, retaining elements frictionally engage the release collar, retaining the collar against axial movement. Spring 46 then moves the plunger downwardly as shown in FIG. 7, bringing head 43 below the outer edges of the leaf spring elements. In this manner the retainer is released and sheets 2 and 3 may be separated. When in the separated position, collar 47 prevents the plunger from becoming disengaged from sheet 3.

Re-locking of the fastener is accomplished without use of rod 52, and is effected merely by pressing on end 45 of plunger 42 so as to move head 43 above the ends of leaf spring elements 21 and 22 so that shoulder 44 is again engaged and retained.

It can be seen, therefore, that the modified form of the invention operates as simply and effectively as the previously described embodiment. Merely pushing and releasing rod 52 unfastens sheets 2 and 3, while these members are locked together when the fastener is pushed back to its original position.

Various modifications in the embodiments illustrated may be provided for the design of this invention. For example, a greater number of leaf spring elements may be used for the retainer member instead of the two springs illustrated. It is preferred, however, to use at least two leaf springs so that opposing forces will be exerted against the release collar in accomplishing the frictional retention thereof. As a further modification retaining elements 21 and 22 may be pivoted to the base and resiliently biased inwardly by a coil spring or other suitable arrangement.

While it is not necessary in all instances to form the leaf springs to include shallowly inclined sections 25 and 26, this provision is advantageous in constructing the fastener in its most compact form. That is to say, these portions assure that a relatively high frictional force will exist between the retainer and the collar. Where elements 21 and 22 are relatively short they must necessarily extend inwardly at a relatively steep angle with respect to the axis of the plunger. Without bending the ends of these elements to the more shallow angle an inadequate frictional force might result from such construction.

It is apparent from the foregoing that we have provided a greatly improved, quick acting push-type fastener of relatively simple design, positive holding force and ease of operation.

The foregoing detailed description is to be clearly understood as given by way of illustration and example only, the spirit and scope of this invention being limited solely by the appended claims.

We claim:

1. In combination with a duality of members to be secured together, each of said members having an aperture therethrough, a fastening device comprising a receptacle received in the aperture of the first of said members, said receptacle having an opening through one end wall thereof, said receptacle including diametrically opposed openings therein having edges tapering toward said one end wall thereof and a flange projecting outwardly therefrom on the opposite end thereof on one side of said first member, a split ring having a free inner dimension less than the exterior of said receptacle, said split ring having end portions received within said diametrically opposed openings for reacting against said edges thereof and said first member on the opposite side thereof for urging said flange into firm engagement with said first member on said one side thereof and attaching said receptacle to said first member, a plunger received in said opening and reciprocative relative to said receptacle, spring means in said receptacle urging said plunger in one direction, said plunger having abutment means thereon remote from said end wall of said receptacle, resilient means attached to and carried by the second of said members to be secured, said resilient means being biased toward said plunger for engaging said abutment thereof and retaining said plunger against the force of said spring means, release means exteriorly of said receptacle for engagement with said resilient means and releasing the same from said abutment to free said plunger therefrom, said plunger having a second abutment for engaging said release means when said plunger is moved in opposition to said spring means for thereby moving said release means to a position of such engagement with said resilient means, said release means being arranged to engage said resilient means such that it is frictionally retained by said release means in said position of engagement for thereby maintaining said resilient means so released from said first mentioned abutment and permitting movement of said plunger to a position remote therefrom.

2. A device for securing together a duality of members to be fastened, said members having alignable apertures therethrough, said device comprising a retaining member having a wall provided with an opening therein said retaining member being attachable to one of said members to be fastened with said opening in said wall in alignment with said opening in said member to be fastened; a plunger extending through said aperture in said wall and reciprocative relative to said wall, said plunger having a first shoulder on one side of said wall, a second shoulder on the opposite side of said wall, and a third shoulder intermediate said first and second shoulders; a coil spring engaging said one side of said wall and said first shoulder for urging said plunger in one direction so as to urge said second shoulder toward said wall; a retaining member attachable to the other of said members to be fastened, said retaining member including a base having an aperture therethrough alignable with said opening in said other member to be fastened, and a plurality of leaf spring members projecting away from said base, said plunger being received in said aperture in said base, extending therethrough and being axially movable relative thereto, said leaf spring members being inclined inwardly toward the shank of said plunger, said leaf spring members having outer edge surfaces engaging said second shoulder for retaining said plunger against movement by said spring; a release member interposed between said wall and said second shoulder, said release member including an aperture therethrough slidably receiving the shank portion of said plunger intermediate said second and third shoulders, said third shoulder on said plunger being engageable with one side of said release member upon movement of said plunger in one direction in opposition to said coil spring for moving said release member therewith, said release member being engageable with the inner surfaces of said leaf springs upon such movement of said release member for forcing said leaf springs outwardly away from said shank of said plunger to a position remote from said second shoulder, said release member being frictionally held by said surfaces of said leaf springs when so brought into engagement with the same, whereby said spring is capable of moving said plunger in the opposite direction without opposition from said leaf springs, said second shoulder being engageable with the opposite side of said release member upon such movement of said plunger in said opposite direction, said coil spring exerting a force sufficient to overcome said frictional force whereby said second shoulder of said plunger causes said release member to move with said plunger in said opposite direction to a position remote from said leaf springs.

3. A device as recited in claim 2 including in addition a spring interposed between said second shoulder and said opposite side of said release member for normally maintaining said release member in engagement with said wall of said support member, said last mentioned spring being relatively weaker than said first mentioned spring.

4. A device as recited in claim 2 in which a portion of each of said leaf spring members adjacent said outer edge surface thereof is more nearly parallel to the axis of said plunger than the remaining portions of each leaf spring member.

5. A device as recited in claim 2 in which said retaining member includes two of said leaf spring members, said two leaf spring members being in diametrically opposed relationship, said second shoulder on said plunger being substantially circular, each of said outer edges of said leaf spring members being arcuate and substantially complementarily engaging a portion of said second shoulder.

6. A device as recited in claim 2 in which said retaining member includes a substantially cup-shaped portion adapted to extend through said opening in said one member to be fastened, said wall of said retaining member being at the end of said cup-shaped portion.

References Cited in the file of this patent

UNITED STATES PATENTS

| | | |
|---|---|---|
| 968,036 | Erickson | Aug. 23, 1910 |
| 1,595,054 | Ballou | Aug. 3, 1936 |
| 2,442,398 | Chandler | June 1, 1948 |
| 2,454,223 | Shippee | Nov. 16, 1948 |
| 2,526,791 | Wroblewski | Oct. 24, 1950 |
| 2,853,112 | Poupitch | Sept. 23, 1958 |
| 2,902,738 | Owens | Sept. 8, 1959 |

FOREIGN PATENTS

| | | |
|---|---|---|
| 173,580 | Great Britain | Dec. 28, 1921 |
| 129,944 | Australia | Nov. 10, 1948 |